US010758828B1

(12) United States Patent
Howell et al.

(10) Patent No.: US 10,758,828 B1
(45) Date of Patent: Sep. 1, 2020

(54) MUSIC MASH UP COLLECTABLE CARD GAME

(71) Applicant: Hasbro, Inc., Pawtucket, RI (US)

(72) Inventors: Alex Howell, Pawtucket, RI (US); John Barros, North Attleboro, MA (US); Carlos E Dominguez, Barrington, RI (US); Craig Desrosiers, Attleboro Falls, MA (US)

(73) Assignee: Hasbro, Inc., Pawtucket, RI (US)

( * ) Notice: Subject to any disclaimer, the term of this patent is extended or adjusted under 35 U.S.C. 154(b) by 206 days.

(21) Appl. No.: 15/925,328

(22) Filed: Mar. 19, 2018

Related U.S. Application Data

(60) Provisional application No. 62/472,847, filed on Mar. 17, 2017.

(51) Int. Cl.
| | |
|---|---|
| *A63F 13/814* | (2014.01) |
| *A63F 9/24* | (2006.01) |
| *A63F 13/63* | (2014.01) |
| *G10H 1/00* | (2006.01) |
| *A63F 1/02* | (2006.01) |

(Continued)

(52) U.S. Cl.
CPC .............. *A63F 13/814* (2014.09); *A63F 1/02* (2013.01); *A63F 9/24* (2013.01); *A63F 13/63* (2014.09); *G06K 19/025* (2013.01); *G10H 1/0025* (2013.01); *A63F 2001/0491* (2013.01); *A63F 2009/2419* (2013.01);

(Continued)

(58) Field of Classification Search
CPC .......... A63F 13/63; A63F 13/814; A63F 9/24; A63F 1/00; G10H 1/0025; G10H 2210/125
See application file for complete search history.

(56) References Cited

U.S. PATENT DOCUMENTS

| | | |
|---|---|---|
| 4,840,382 A | 6/1989 | Rubin |
| 4,946,416 A | 8/1990 | Stern et al. |

(Continued)

FOREIGN PATENT DOCUMENTS

WO    WO0112285 A1    2/2001

OTHER PUBLICATIONS

Harmonix Blog, "Introducing Our Next Game: DropMix", Mar. 10, 2017, <http://www.harmonixmusic.com/blog/introducing-our-next-game-dropmix/> (Year: 2017).*

(Continued)

*Primary Examiner* — Chase E Leichliter
(74) *Attorney, Agent, or Firm* — Perry Hoffman

(57) ABSTRACT

An intuitive music composition game platform with various modes of operation in a single reader system and a music mash up collectable card game and method using cards with tags and unique identifications. A single reading platform includes a cover for card storage and for supporting a smart device platform for reading many Near Field communication (NFC) embedded cards, with stacking features and colored light indicated input lanes selection for user identification and selection. Various game modes include individual, studio mix, party modes game play features in music mash up collectable card games, which may be used together with or independent of accessory devices as controllers, or smart device user interfaces with Bluetooth™ or Wi-Fi for communicating user selection and operation.

20 Claims, 12 Drawing Sheets

(51) Int. Cl.
*G06K 19/02* (2006.01)
*A63F 1/04* (2006.01)

(52) U.S. Cl.
CPC ............... *A63F 2009/2477* (2013.01); *G10H 2210/125* (2013.01); *G10H 2240/145* (2013.01)

(56) References Cited

U.S. PATENT DOCUMENTS

| | | | |
|---|---|---|---|
| 5,195,920 A | 3/1993 | Collier | |
| 5,237,617 A | 8/1993 | Miller | |
| 5,920,024 A | 7/1999 | Moore | |
| 5,984,810 A | 11/1999 | Frye et al. | |
| 6,150,947 A | 11/2000 | Shima | |
| 6,290,565 B1 | 9/2001 | Galyean, III et al. | |
| 6,319,010 B1 | 11/2001 | Kikinis | |
| 6,346,025 B1 | 2/2002 | Tachau et al. | |
| 6,352,478 B1 | 3/2002 | Gabai et al. | |
| 6,356,867 B1 | 3/2002 | Gabai et al. | |
| 6,368,177 B1 | 4/2002 | Gabai et al. | |
| 6,514,117 B1 | 2/2003 | Hampton et al. | |
| 6,525,252 B1 | 2/2003 | Klausen et al. | |
| 6,544,098 B1 | 4/2003 | Hampton et al. | |
| 6,588,756 B1 | 7/2003 | Hughes | |
| 6,626,728 B2 | 9/2003 | Holt | |
| 6,650,870 B2 | 11/2003 | White et al. | |
| 6,773,322 B2 | 8/2004 | Gabai et al. | |
| 6,773,344 B1 | 8/2004 | Gabai et al. | |
| 6,959,166 B1 | 10/2005 | Gabai et al. | |
| 7,247,097 B2 | 7/2007 | Woolston | |
| 7,791,483 B2 | 9/2010 | Oberle | |
| 8,025,573 B2 | 9/2011 | Stenton et al. | |
| 8,088,003 B1 | 1/2012 | Bickerton et al. | |
| 8,420,923 B1 * | 4/2013 | Choi | G10H 1/32 84/476 |
| 8,503,570 B2 | 8/2013 | Min | |
| 8,597,128 B2 | 12/2013 | Kelly et al. | |
| 8,894,462 B2 | 11/2014 | Leyland et al. | |
| 8,923,885 B2 | 12/2014 | Lefevre et al. | |
| 9,183,755 B2 | 11/2015 | Shi | |
| 9,474,961 B2 | 10/2016 | Leyland et al. | |
| D771,142 S | 11/2016 | Langhammer et al. | |
| 9,659,577 B1 | 5/2017 | Langhammer | |
| D792,468 S | 7/2017 | Langhammer et al. | |
| 9,721,586 B1 | 8/2017 | Bay et al. | |
| 10,102,836 B2 * | 10/2018 | Mintz | A63F 1/00 |
| 2003/0008694 A1 | 1/2003 | Troy et al. | |
| 2006/0076733 A1 * | 4/2006 | Ritchie | A63F 3/00119 273/242 |
| 2006/0154726 A1 * | 7/2006 | Weston | A63F 13/327 463/37 |
| 2007/0197297 A1 * | 8/2007 | Witchey | A63F 13/71 463/42 |
| 2008/0207306 A1 * | 8/2008 | Higbie | A63F 1/00 463/23 |
| 2009/0264200 A1 * | 10/2009 | Schwartz | A63F 1/02 463/40 |
| 2009/0315257 A1 * | 12/2009 | Blumenstock | A63F 1/04 273/237 |
| 2010/0004062 A1 | 1/2010 | Maharbiz et al. | |
| 2010/0043625 A1 | 2/2010 | Van Geenen et al. | |
| 2013/0296008 A1 * | 11/2013 | Hardison | A63F 1/02 463/11 |
| 2014/0002417 A1 * | 1/2014 | Yoshida | G06F 3/039 345/174 |
| 2014/0004921 A1 * | 1/2014 | Higbie | A63F 13/80 463/16 |
| 2014/0048590 A1 | 2/2014 | Britt | |
| 2014/0329577 A1 * | 11/2014 | Shortino | A63F 3/0645 463/19 |
| 2015/0328541 A1 | 11/2015 | Van Haaften | |
| 2016/0287998 A1 * | 10/2016 | Kawanabe | G06K 19/0723 |
| 2017/0186411 A1 * | 6/2017 | Mintz | A63F 1/00 |

OTHER PUBLICATIONS

Eddie Makuch, "Rock Band Dev Announces a Cool-Sounding New Music Game", Mar. 10, 2017, <https://www.gamespot.com/articles/rock-band-dev-announces-a-cool-sounding-new-music-/> (Year: 2017).*

Roll for Crit, "DropMix—Harmonix's Music Card Game | RFC Podcast", Mar. 14, 2017, <https://www.youtube.com/watch?v=NhXng5nKKlo> (Year: 2017).*

* cited by examiner

MUSIC MASH UP COLLECTABLE CARD GAME

PRIORITY CROSS-REFERENCE TO RELATED APPLICATION

This application claims priority pursuant to 35 U.S.C. 119(e) or 120 from U.S. Provisional Application No. 62/472,847, filed Mar. 17, 2017.

FIELD OF THE INVENTION

The present invention relates to a game system and more particularly to a music mash up collectable card game system and method using cards with tags and unique identifications, a single reading platform and a cover for card storage and for supporting a smart device.

BACKGROUND OF THE INVENTION

The known prior art of interest for electronic musical composition games use extended surface game play areas for accommodating multiple separately received game components, tokens or cards at different spaces or slots at a matrix of sensors with respect to the game surface. Both U.S. Pat. No. 6,525,252 issued to Klausen, et al. (hereafter 'Klausen') in 2003 for a "Device for Composing and Arranging Music," and U.S. Publication No. 2010/0043625 A1 published in 2010 to Van Geenen, et al. (hereafter 'Van Geenen') for a "Musical Composition System and Method of Controlling a Generation of a Musical Composition" disclose devices for composing, arranging music, game boards and game play incorporating sensor devices, a plurality of game pieces, tokens or blocks for being received or arranged at sending or receiving positions with various playback game modes. The sensor device has a plurality of receiving positions, with pre-determined musical features, notes, beats, clips or samples for suitable musical features. These systems provide for spatial placement tokens by users on a spatial board configuration, determining respective locations and types of an assembly of tokens placed in a spatial configuration for translating a spatial ordering of the tokens in the spatial configuration into a temporal ordering, including arranged to detect or prevent at least an attempted placement of a token of a certain type at a position in the spatial ordering violating any of at least one constraint associated with the certain type.

Klausen discloses as an example, a musical block system including several musical blocks 1a-1d, FIG. 1, a plate part 2, FIG. 2, a sensor part 5, FIG. 3, and an optional sensor block. The musical block represents a note, a rhythm, a melodic sequence or other musical parameters. Each musical block may have a different shape and/or color and must be able to be stacked vertically. The plate part is an object to which the blocks are attached and is a two-dimensional array (x and y) where one axis equals time and the other axis determines which instrument/sample track to activate. The sensor part is able to determine where the blocks are placed on the plate part and which type of block each is. The sensor part includes a loudspeaker 6, a microphone 7, a connecting part 4, and a control panel 8 having a number of control buttons 9a-9c, such as 'play', 'record' and 'stop'. The different positions of the blocks along the y-axis may represent different instrument tracks and each sub-population represents a certain musical feature. The sensor part determines position of the blocks and to which sub-population they belong allowing the creation of music composition, arrangements, soundscapes or other musical expressions. As blocks are moved the composition is changed accordingly.

The tokens 5, 6, 7 of Van Geenen, are configured for placement by a user in a spatial configuration on a playing surface 8 of the game board 2. The playing surface 8 comprises a number of fields 9, arranged in rows 10a-10e and columns 11a-11j. The columns determine a spatial ordering, which is translated into a temporal ordering by the control unit 3. That is to say that a first column 11 a represents a first time interval of the composition and that the time advances by a certain time interval with each column. The time interval may be an absolute time interval or a relative time interval. For example, each column 11 may represent a bar, a beat or a note of a particular duration, depending on the chosen granularity.

The Van Geenen game board 2 includes sensors 13 positioned within the game board and arranged to determine the types of tokens placed on a field present over the respective sensor 13. The sensor 13 may be a type of connector for mating with a corresponding connector on a token placed on the field, so as to interrogate the token as to its type and that of any token stacked on top of it. In another embodiment, the tokens 5-7 are provided with Radio-Frequency Identification tags, and the sensors 13 comprise transceivers for reading out type information from the tags. Other wireless or wired variants are conceivable, such as those using near field communication.

The Van Geenen interface 14 in the game board 2 allows the respective locations and types of the tokens 5-7 assembled in a spatial configuration on the playing surface 8 to be communicated to the control unit 3 via a corresponding interface 15 in the control unit 3. The latter comprises a processor 16, programmed by means of instructions stored in a memory unit 17. The processor 16 has access to a further memory unit 18 containing data representative of composition rules as well as a database relating token types to aspects of musical fragments. The processor 16 is also able to control the visual display unit 4, as well as an audio output stage 19 for driving a speaker system 20. The Van Geenen spatial configuration, i.e., the amalgamation of the sub-assemblies of tokens, is placed on different game boards 2, connected to control units in communication with each other. In that case, the users of the several game boards 2 could collaborate over a distance to compose a single piece of music. Such a system allowing for collaboration is even easier to implement using several embodiments of the second composition system. In particular the second composition system may dispense with a game board on which tokens are to be placed, but may instead use only representations of interlocking blocks or other types of tangible objects. Tokens of different dimensions may be used to represent aspects of fragments of corresponding different lengths, i.e. durations.

SUMMARY OF THE INVENTION

The present inventions facilitate an intuitive music platform with various modes of operation and game play including individual, studio mix, party modes as well as game play features in a music mash up collectable card game, with user interface features, methods and apparatus which may be used together with or independent of accessory devices as controllers, such as smartphones or smart device user interfaces.

In a present described embodiment a single reader game system may have a truncated pyramid platform with an actuator or a circular platform with a rotating actuator in an alternate embodiment. The platform is able to read many cards, each card having NFC embedded technology. The platforms use LEDs for input selection for slots or lanes. Bluetooth™ Smart Low energy (BTLE or BLE) may be used for communicating platform position or actuator use with light indicators for user selection and operation. The playing card game system centers around an electronic device, such as a smart phone or a tablet computer or other similar device, with a video game or scoring App running on the smart device. The smart device will communicate with the first housing, having the smart device wired link or as in the present embodiment wireless via Bluetooth™, Wi-Fi or another wireless similar protocol.

The single reader game system is compact and lightweight and is ideal for portability, allowing players to easily transport the apparatus. The system is of a simple yet rugged construction so as to produce a low cost structure.

Briefly summarized, the invention relates to a playing card reader game system for reading a plurality of type information identifiers, the system including a multiplicity of integrated circuit tags, each tag including type information identifiers, a multiplicity of playing cards, each card including at least one tag for transmitting one or more of the type information identifiers associated with the tag of each card, a first housing comprising a single reading area at a surface region of the housing for collecting a plurality of the cards each placed serially with one another in a series forming a collection of two or more cards at the surface region of the housing, an antenna subsystem in the housing with an antenna signal range to receive the type information identifiers associated with the collection of cards at the surface region, a tag reader for reading the type information identifiers received with the antenna subsystem from each card of the collection of cards at the surface region, a light source for simultaneously illuminating one or more of a multiplicity of illuminating colors in relation to the surface region of the housing, an actuator for changing one or more of the illuminating colors, the actuator further selecting the type information identifiers associated with the cards at the surface region to be received with the antenna subsystem, an information processor, and an audio subsystem in communication with the information processor at the first housing for issuing announcement sounds and music composition sounds responsive to the tag reader, light source and actuator.

BRIEF DESCRIPTION OF THE DRAWINGS

For the purpose of facilitating an understanding of the invention, the accompanying drawings and detailed description illustrate preferred embodiments thereof, from which the invention, its structures, its construction and operation, its processes, and many related advantages may be readily understood and appreciated.

DESCRIPTION OF THE PREFERRED EMBODIMENTS

Figure 1:
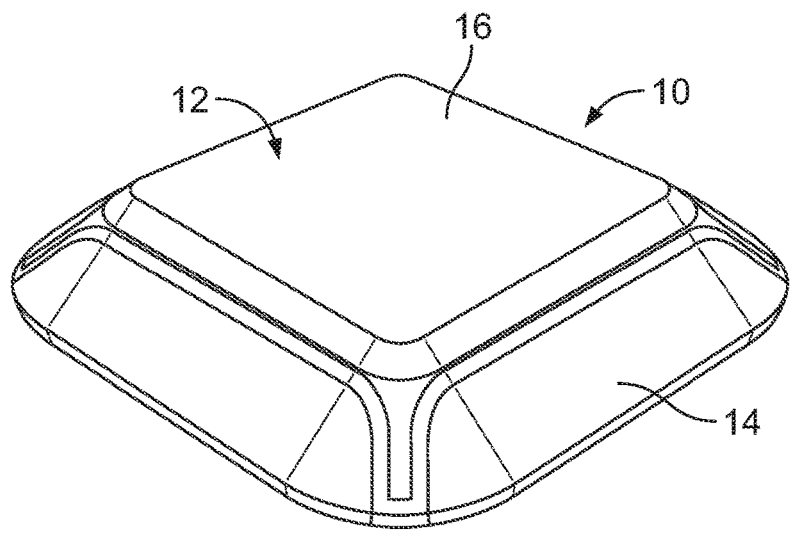
FIG. 1 is an isometric view of a preferred embodiment of the present invention in the form of a closed card reader game system.

The following description is provided to enable those skilled in the art to make and use the described embodiments set forth in the best mode contemplated for carrying out the invention. An intuitive music composition game platform with various modes of operation in a single reader system and a single reading platform includes a cover for card storage and for supporting a smart device platform for reading playing cards with stacking features and colored light indicated selection and other indicia for user identification and selection. Various game modes include individual, studio mix, party modes game play features in music mash up collectable card games, which may be used together with or independent of accessory devices as controllers, or smart device user interface selection and operation communications. Various modifications, equivalents, variations, and alternatives, however, will remain readily apparent to those skilled in the art. Any and all such modifications, variations, equivalents, and alternatives are intended to fall within the spirit and scope of the present invention.

Each playing card includes at least one integrated circuit (IC) chip tag embedded with each playing card, with each tag including type information identifiers for transmitting one or more of the type information identifiers associated with the tag of each playing card. The tag has circuitry and memory for data storage and transmission and may be provided as a Near Field Communication (NFC), Radio Frequency Identification (RFID), Bluetooth™ (BLE) or Bluetooth™ Low Energy (BTLE) tags or other similar communications means to store and transmit type information identifiers. In the present embodiment NFC type tags are employed that uniquely identify the type information identifiers. The NFC tag reader for reading the type information identifiers are received via an antenna subsystem from each card of the collection of cards at the surface region of the housing, uses a single NFC tag reader loop antenna subsystem in the housing with an antenna signal range to receive the type information identifiers associated with the collection of cards at the surface region to read the tag and its unique identifiers. The NFC reader and antenna subsystems of the present described embodiment may be provided as an NXP-brand reader chip that handles NFC communication protocol, however other tag IC chips may be used such as RFID, BLE or BTLE tags or the like. The tags antenna subsystem is fairly typical with loops or coils of copper insulated wire, or a printed circuit board (PCB) antenna may be used or other antennae configurations optimized to ensure FCC compliance.

The information processor used with the NFC tag reader and antenna subsystems for reading the type information identifiers may employ an ARM processor, known in the industry. The type information identifiers are received in relation to a light source for simultaneously illuminating one or more of a multiplicity of illuminating colors in relation to the surface region of the housing and operates LEDs there at as one or more light sources. The actuator switch or the like is provided for changing one or more of the illuminating colors. The actuator facilitates use of the single reading area at a surface region to avoid the need for multiple spatial slots or a matrix of sensors. The actuator is further used to select the type information identifiers associated with the cards at the surface region to be received with the antenna subsystem in association with game play, also using an audio subsystem in communication with at the first housing for issuing announcement sounds and music composition sounds responsive to the tag reader, light source and actuator, and plays sounds along with having other capabilities.

Certain techniques for issuing announcement sounds and music composition with responsive light source and actuator or sensor structures include Applicants' Assignees U.S. Pat. No. 8,088,003 to Bickerton, et al. for "Audio/visual display toy for use with rhythmic responses" issued Jan. 3, 2012 disclosing a game having a base structure including an array of lights with associated music, and U.S. Patent Application No. 2017/0186411 A1 to Mintz, et al. for "Apparatus, Systems, and Methods for Music Generation" published Jun. 29, 2017 (hereafter 'Mintz') relating to game play composing musical compositions using musical content to synthesize music, which are each herein incorporated by reference in their entirety. The smart device is in communication with the information processor with the tag reader identifying the type information identifiers received for use by the smart device.

A commercial version of the Mintz game is presently being marketed by Applicants' Assignee under the brand DROPMIX™ and includes hardware having five lanes for card play and a location for a smart device, such as an iPhone™.

An embodiment of the present invention illustrated in FIGS. 1-7 is a compact and portable single reader game system 10. The game system includes a first, lower, or platform housing 14 and a removable second, upper or cover 12. The game system is shaped generally as a geometric frustum, or more particularly, generally as a truncated pyramid with rounded edges.

Figure 2:
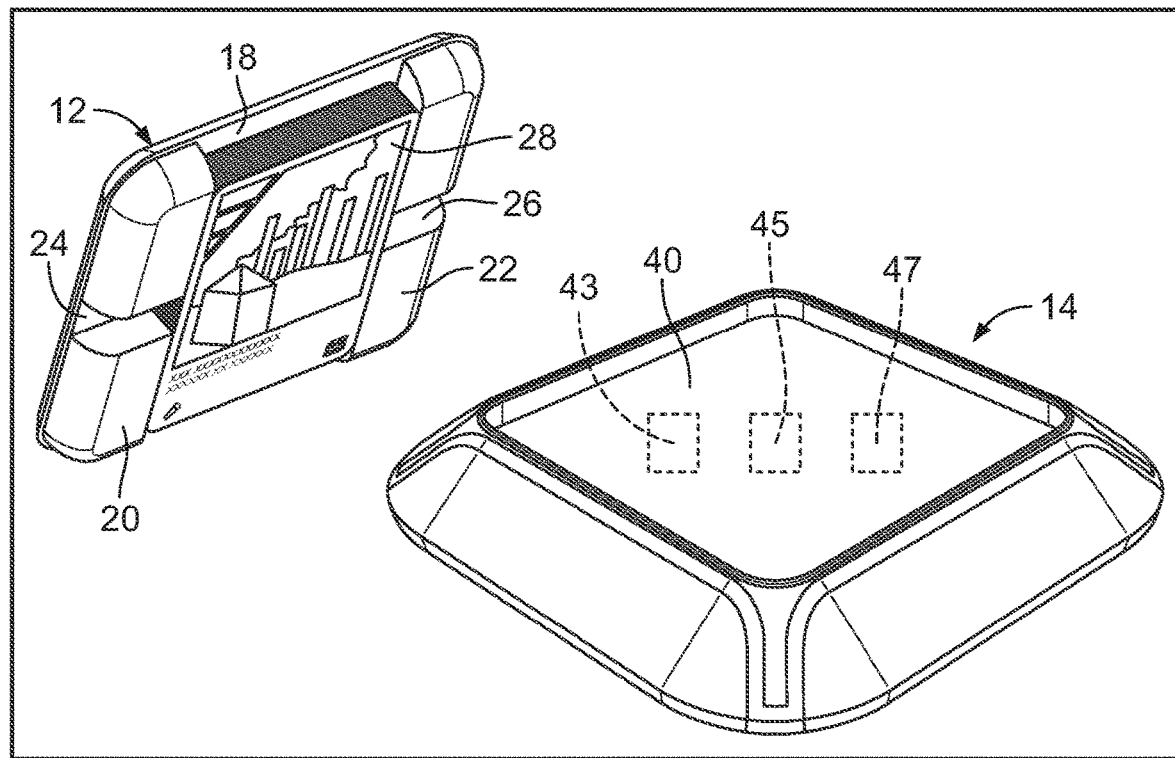
FIG. 2 is an isometric view of the game system shown in FIG. 1, with a cover storing a deck of cards being removed from a reading platform.
Figure 3:
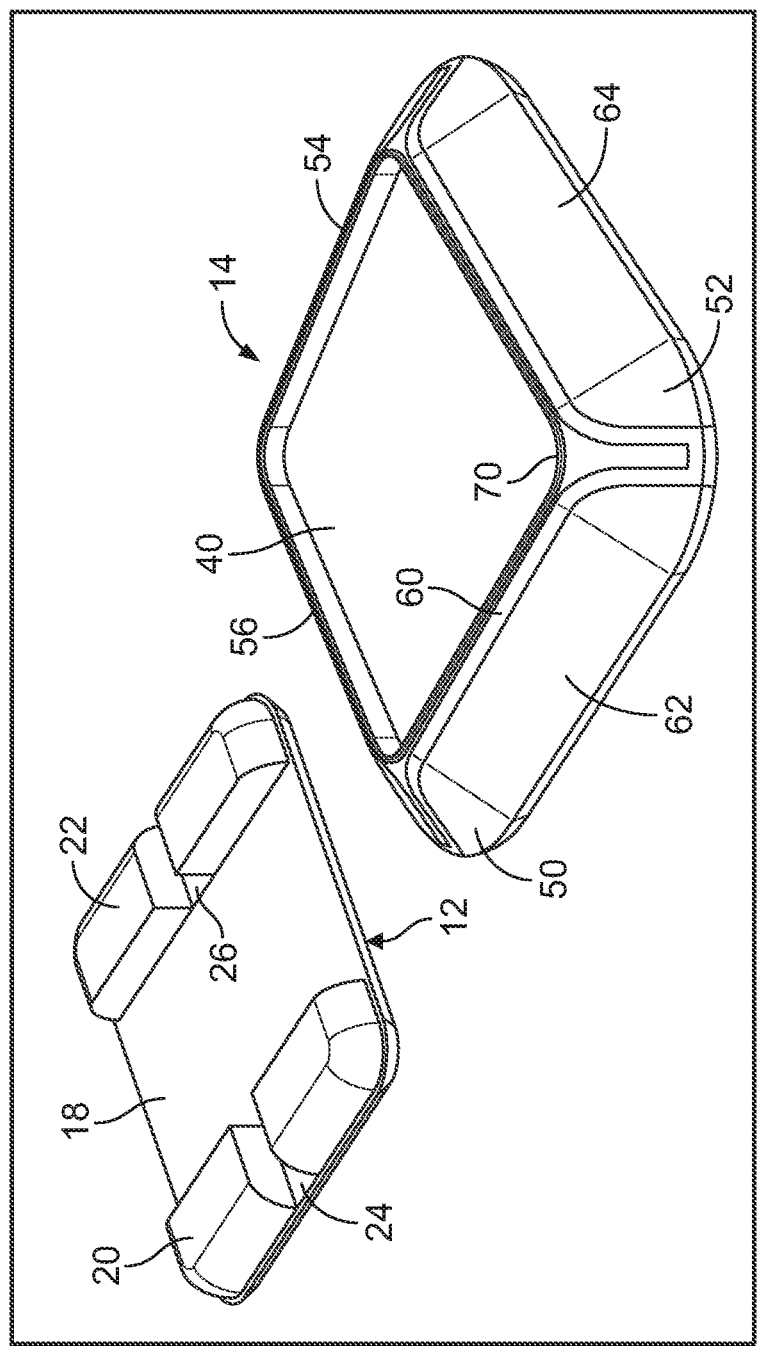
FIG. 3 is an isometric view of the game system shown in FIGS. 1 and 2, with the cover inverted in a smart phone holder position, the deck of cards removed and a reading surface exposed.

The cover 12 includes a smooth top surface 16, a recessed inner surface 18, FIGS. 2 and 3, two peripheral ridges 20, 22 where each is bisected by a groove 24, 26. The cover 12 is able to function as a storage bin for a collection of cards 28 placed on the inner surface 18 when the cover 12 is mounted to the platform 14 as shown FIG. 1, where the top surface 16 is uppermost. When the cover is removed and inverted as shown in FIG. 3, after the cards are removed, the cover functions as a holder for a smart device, such as a smart phone 30, FIGS. 4-6, which may be held in the grooves 24, 26 and against the ridges 20, 22. The cover may be formed of a flexible translucent material to indicate the position of the stored cards when viewed from the top. The material also allows the cover 12 to fit snugly to the platform 14 and the cards to fit snugly to the cover.

Figure 4:
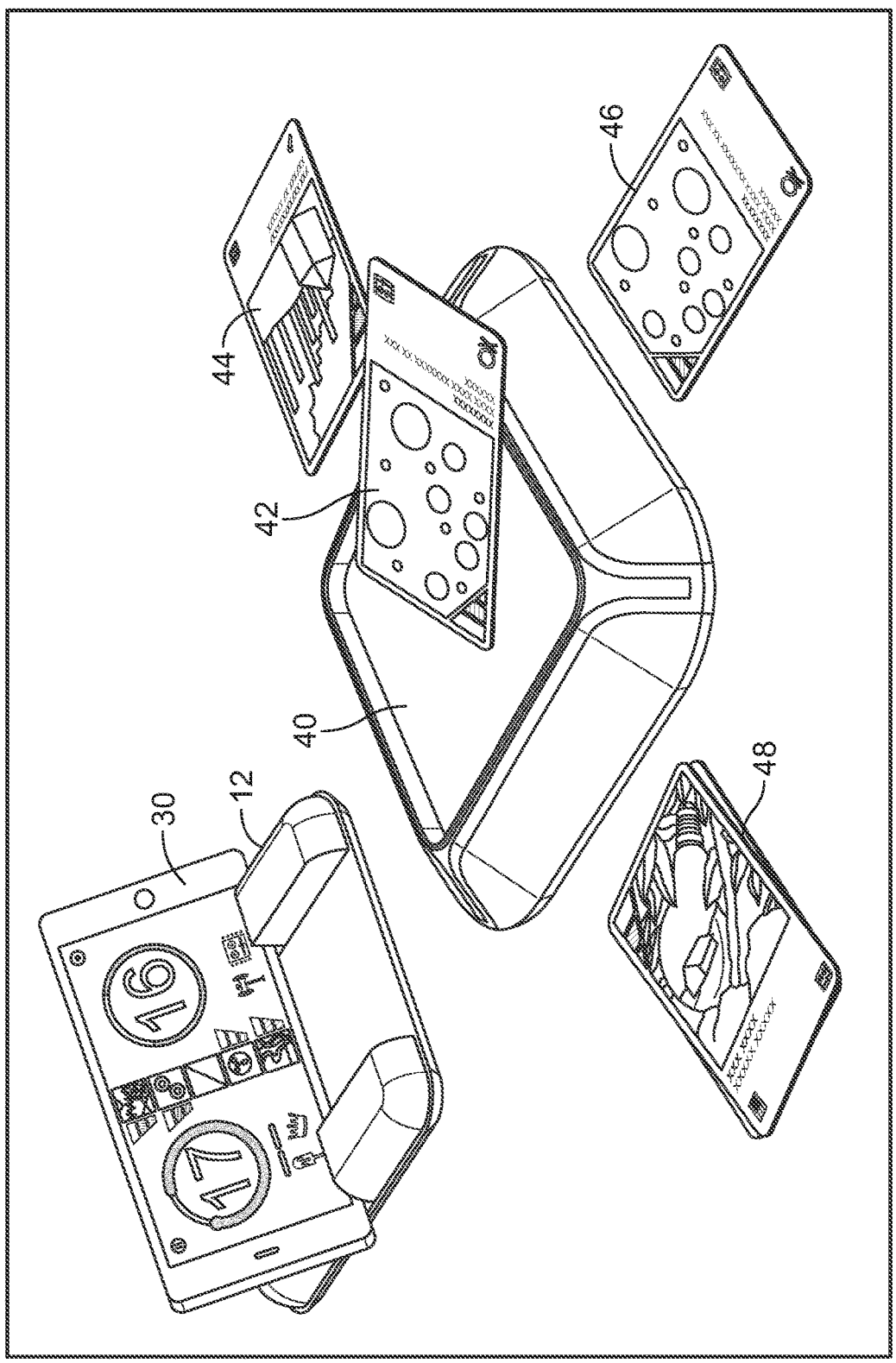
FIG. 4 is an isometric view of the game system shown in FIGS. 1-3, in play with a first card being placed on the reading surface and a smart phone being supported by the cover.

The first platform housing 14 may have only one matted top reading surface 40 FIGS. 2 and 3 providing a single reading area at a surface region, to act as a lane or slot on which a multiplicity of cards (as many as thirty), such as the cards 42, 44, 46, 48, FIG. 4, may be stacked. Each card includes embedded integrated circuit tags for near field communication technology (NFC) or a radio-frequency identification system (RFID). A sensor or antenna subsystem 43 and tag reader and information processor 45 mounted in the platform may read each card stacked on the top surface and transmits the unique type information identifiers of each card to the smart device 30 mounted to the cover 12. A speaker/microphone or audio subsystem 47 may also be mounted in the platform. The audio subsystem 47 may be provided for issuing the announcement and music composition sounds responsively with an output speaker for making audible sounds, and may further include a microphone feature for receiving audible information from a game player user.

Figure 9:
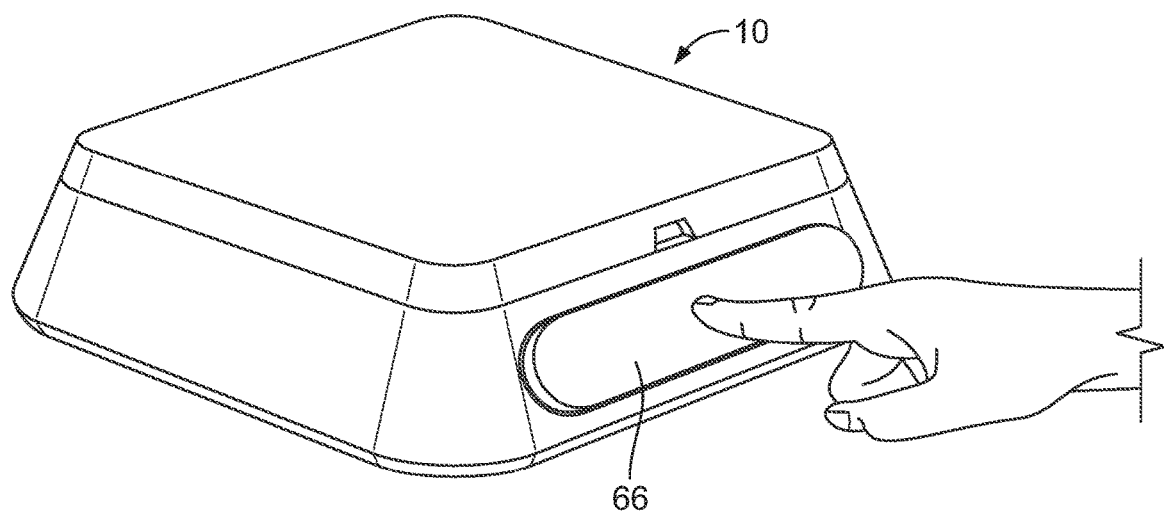
FIG. 9 is an isometric view of the game system with a single actuator.

Slanted sidewalls 50, 52, 54, 56, FIG. 3, of the base platform 14 may support the top surface 40. One or more actuators may be mounted to the platform and to be used by players during game play. The actuator provided may be mechanical switch electrical switch input as discussed below, or in the alternate may include encoded or potentiometer rotational turn switching for rotational input, other input mechanisms may include touch or capacitive sensing or audible command switch inputs or the like. An actuator rim 60 may be mounted around the top surface 40. As a further alternative, the actuator may include four switch panels mounted to the four sidewalls. Two of the actuator panels 62, 64 are shown in FIG. 3, mounted in the sidewalls 50, 52, respectively. Or, as another alternative, a single panel 66, FIG. 9, may be the actuator. Each player uses the actuator during game play as will be explained in detail below.

The electronics in the platform 14 may include a main processor and information processors for NFC, BTLE, BLE, Wi-Fi communication with iOS and Android or other smart devices like cell phones, iPads, Apple TV, Alexa, and Chromcast. An LED light or lights may be placed in conspicuous locations, such as along an upper rim light guide 70 and/or along a lower border, or behind the actuator panels to function as backlighting along the sides of the platform. The lights may function as feedback to the players to provide information such as actions needed to be taken, taken actions that are accepted, and/or those actions that are not accepted. Each side of the platform may have its own feedback color and may light up when information is directed to a player.

Figure 5:
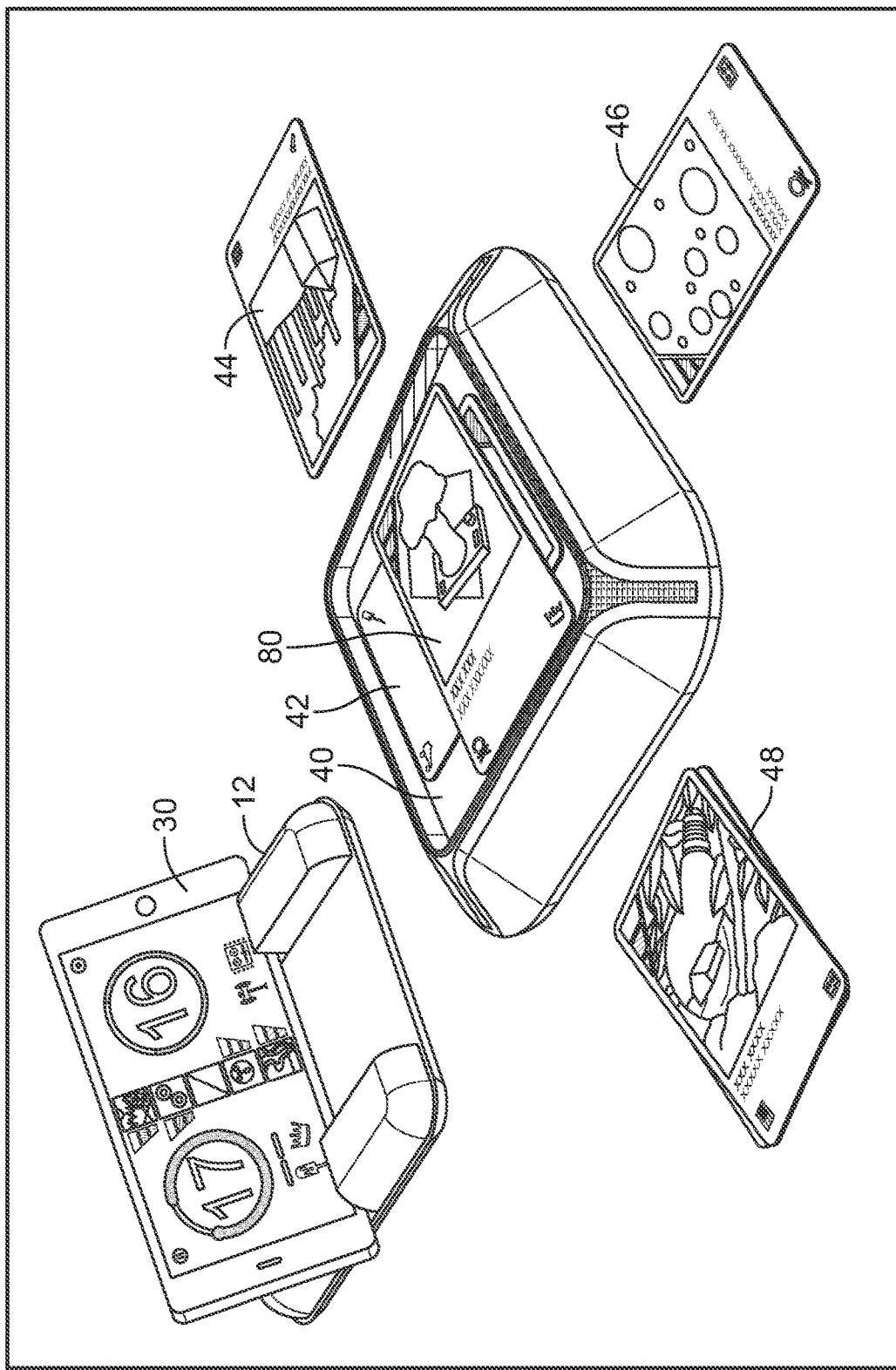
FIG. 5 is an isometric view of the game system FIGS. 1-4, in play with a second card being stacked on top of the first card, both being on the reading surface.
Figure 6:
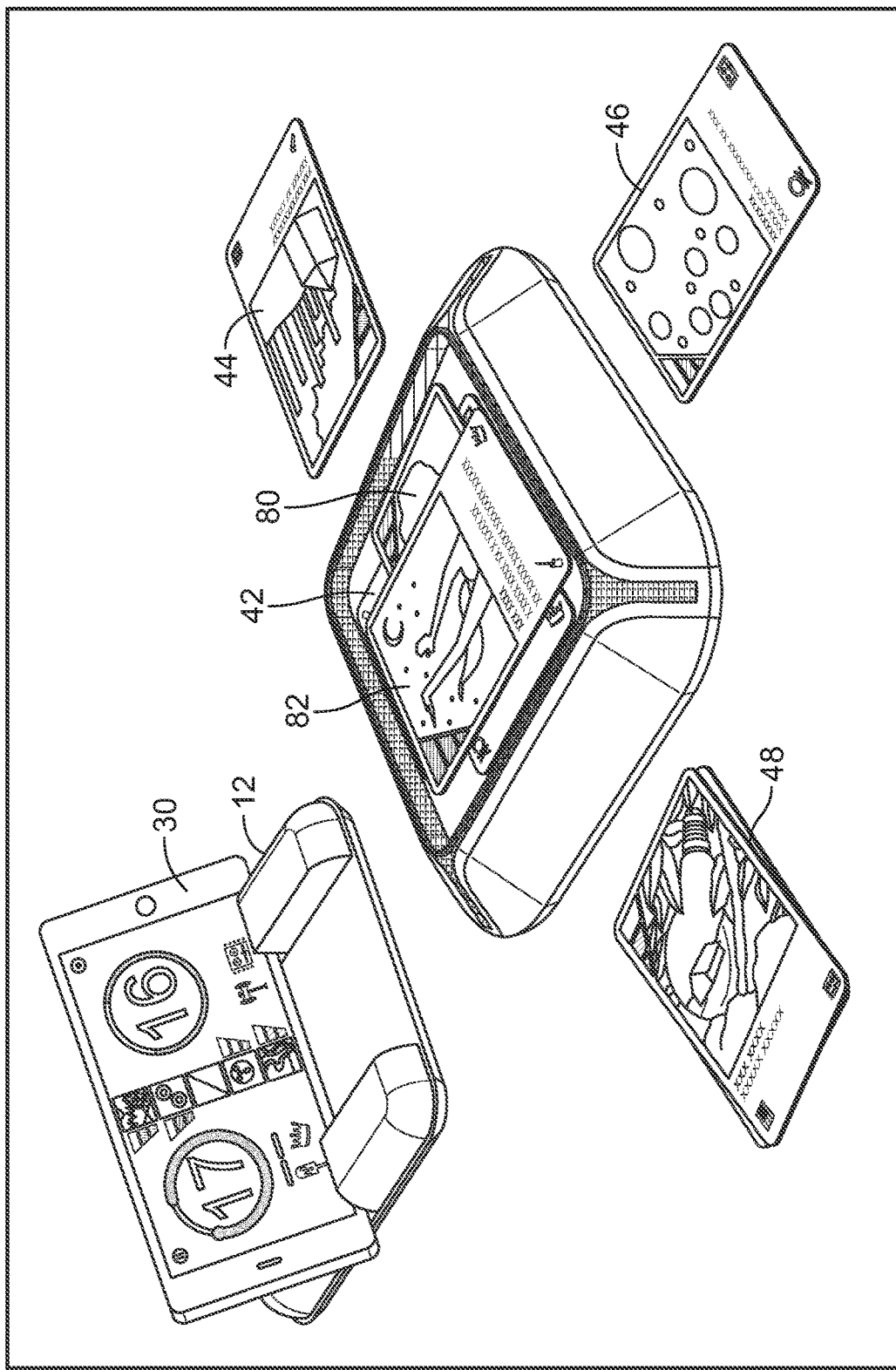
FIG. 6 is an isometric view of the game system FIGS. 1-5, in play with a third card being stacked on the reading surface on top of both the first and second cards.
Figure 7:
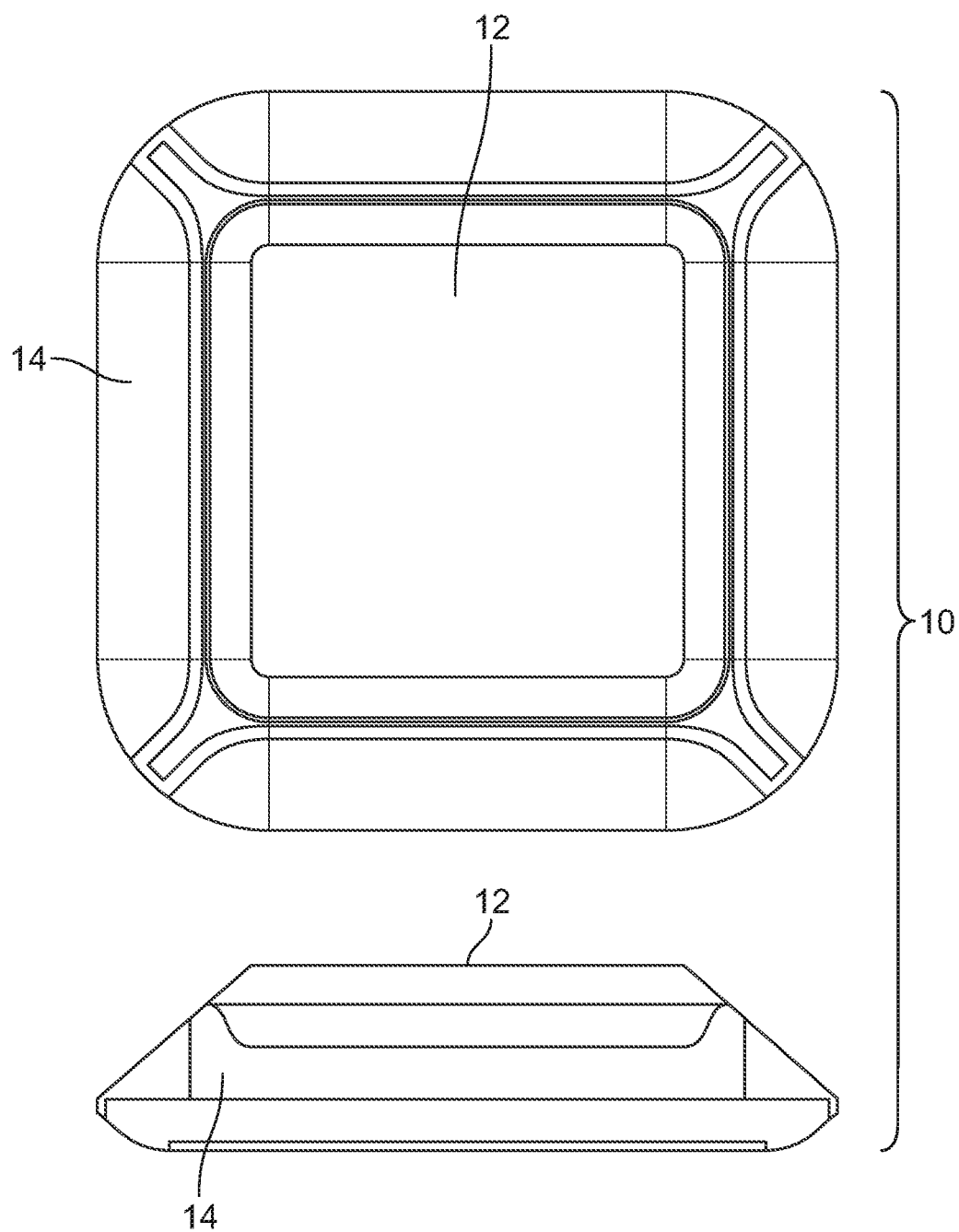
FIG. 7 is a plan and elevation view of the game system FIGS. 1-6, in a closed configuration.

During play, a multiplicity of cards may be played by stacking them on the reading surface 40, as shown in FIGS. 4-6. It is noted that the cards may be stacked without regard to the angle of placement of each card and yet the platform assembly will still read each card. For example, a first player may place the first card 42, FIG. 4, on the sole top surface 40. The tag or tags of the first card 42 is read by the platform assembly and transmitted to the smart device 30, which may record type information identifiers and assign points. A second player during his/her turn may then stack another card 80, FIG. 5, on top of the first card 42. The platform assembly reads the second card 80, transmits the card's information to the smart device 30 that may then make adjustments, such as by adding or subtracting players' points. Thereafter, the first or a third player may play a third card 82, FIG. 6. The third card is stacked on top of the second card 80 to allow the platform assembly to read the third card and transmit information to the smart device. The smart device then makes appropriate adjustments to the game. The system may read and make adjustments for up to thirty cards stacked on the reading surface 40 during a game. The cards may be collectible and different decks may be used or developed to play different games.

The system 10 may be formed of ABS plastic and measures about 6-7 inches square by 1-2 inches tall. Three AA/LR6 alkaline batteries may power the system having a voltage range of 2.7-4.8 volts. An LED may input lanes colored yellow/red, red, red/blue, blue, blue/green, with the light source being capable of simultaneously illuminating one or more of a multiplicity of illuminating colors in relation to the surface region of the housing, preferably a single or two colors at a time being indicative of the type information identifiers associated with the cards at the surface region to be received as discussed herein in connection with the described game play using color or other external visual indicia associated with playing cards that may be played by the game player user. Players may change colors by tapping on the input actuator. This simulates the functionality of reader and the cards.

Figure 8:
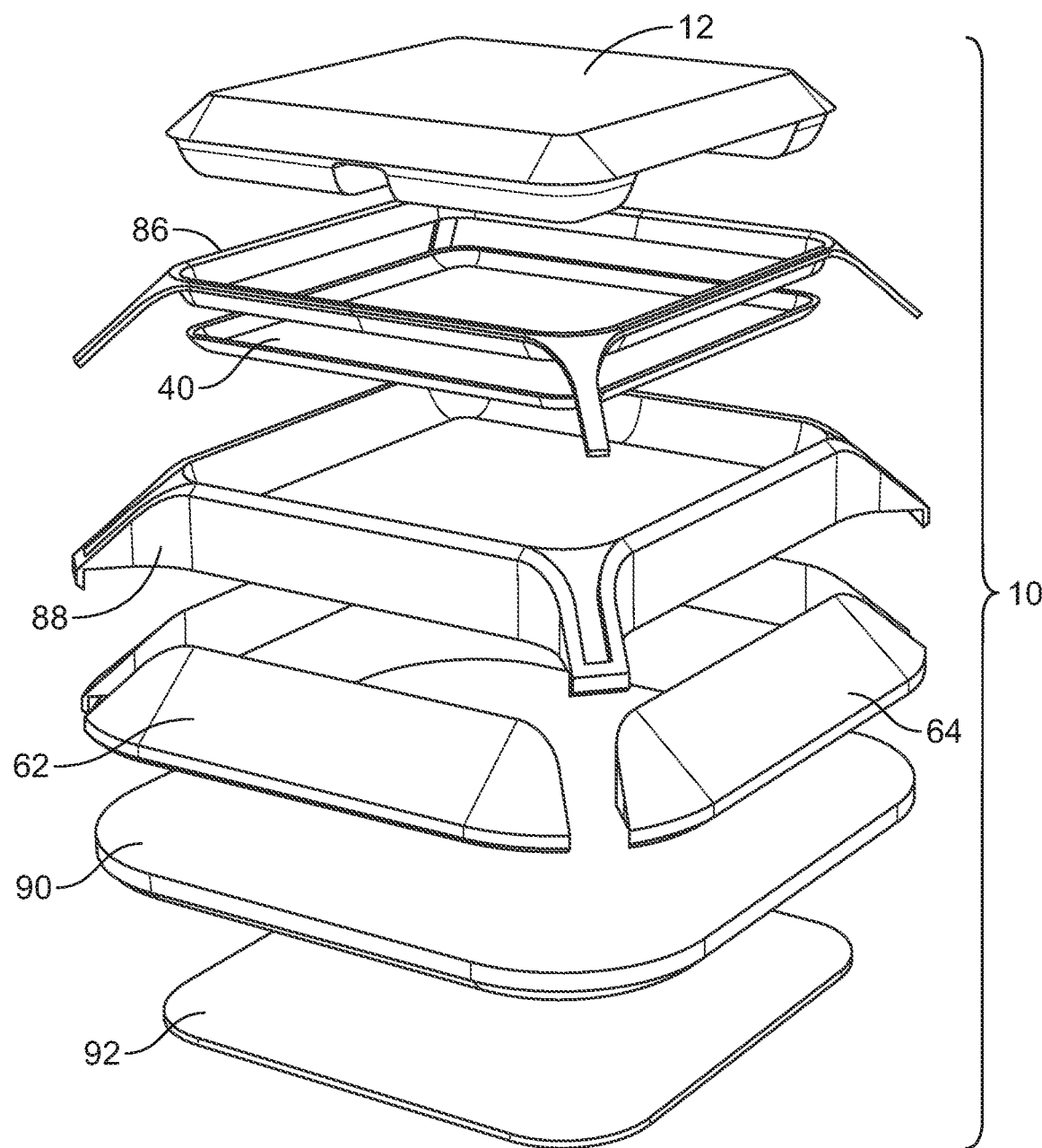
FIG. 8 is an exploded isometric view of the game system shown in FIG. 7.

Referring now to the exploded view of FIG. 8 of the present described embodiment, the top element of the system 10 is the cover 12 having dimensions of approximately 3.5 inches by 3.5 inches. The next element is an LED light guide 86, followed by the card reading surface 40. The next elements are the sidewalls 88, and the actuators, such as the actuator elements 62, 64 or the alternative actuator 66, FIG. 9, followed by a floor 90 and a base 92. Together the slanted sidewalls 50, 52, 54, 56, elements 62, 64, light guide 86, and floor 90 form an outer peripheral bezel sloping face adjacent the surface region card reading surface 40 single reading area, having dimensions of approximately 6.25 inches by 6.25 inches. Thus the outer peripheral surface area of the system 10 footprint has an overall top plan view surface area of about forty (40) square inches. The top reading surface 40 at the surface region provides the single reading area having dimensions of approximately 3.5 inches by 3.5 inches, with the single reading area of the surface region surface area of about twelve (12) square inches at the card reading surface 40. The playing cards discussed herein have dimensions of approximately 2.5 inches by 3.5 inches, with a surface area of about nine (9) square inches. In the circular platform single reading area with a rotating actuator alternate embodiment of FIGS. 12-22 discussed below, the outer bezel about the single reading area surface region has a diameter of approximately 4.25 inches, with a surface area of about fourteen (14) square inches top reading surface for placement of the playing cards, as described herein.

Accordingly with the playing card surface area being about nine (9) square inches, and the single reading area surface region being about twelve (12) square inches with an overall surface area of about forty (40) square inches in the present described embodiment, while alternate circular platform embodiment overall surface area and its single reading area surface region has about fourteen (14) square inches, the system overall upper surface area ranges approximately between 14-40 square inches. With reference to the approximate 9 square inch surface area of the playing cards, the system overall surface area ranges about one and one-half to four and one-half times (1.5-4.5×) the playing card surface area of the described embodiments, or approximately one to five times (1-5×) the playing card surface area generally, and preferably less than 5.

Thus the system is generally sized to have overall top plan view surface area of less than five times that of the playing card surface area. With the single reading area of the present described embodiment surface region surface area of about twelve (12) square inches, and the circular platform single reading area alternate embodiment single reading area surface region of about fourteen (14) square inches, with single reading area surface region surface area thus ranging about one and one-half and less than two times (1.5-2×) the playing card surface area, preferably less than 2. Thus the single reading area surface region surface area is generally less than two times that of the playing card surface area. Accordingly the single reading area surface region surface area is generally less than two times, with the overall system generally sized with surface area of less than five times that of the playing card surface areas respectively.

Figure 10:
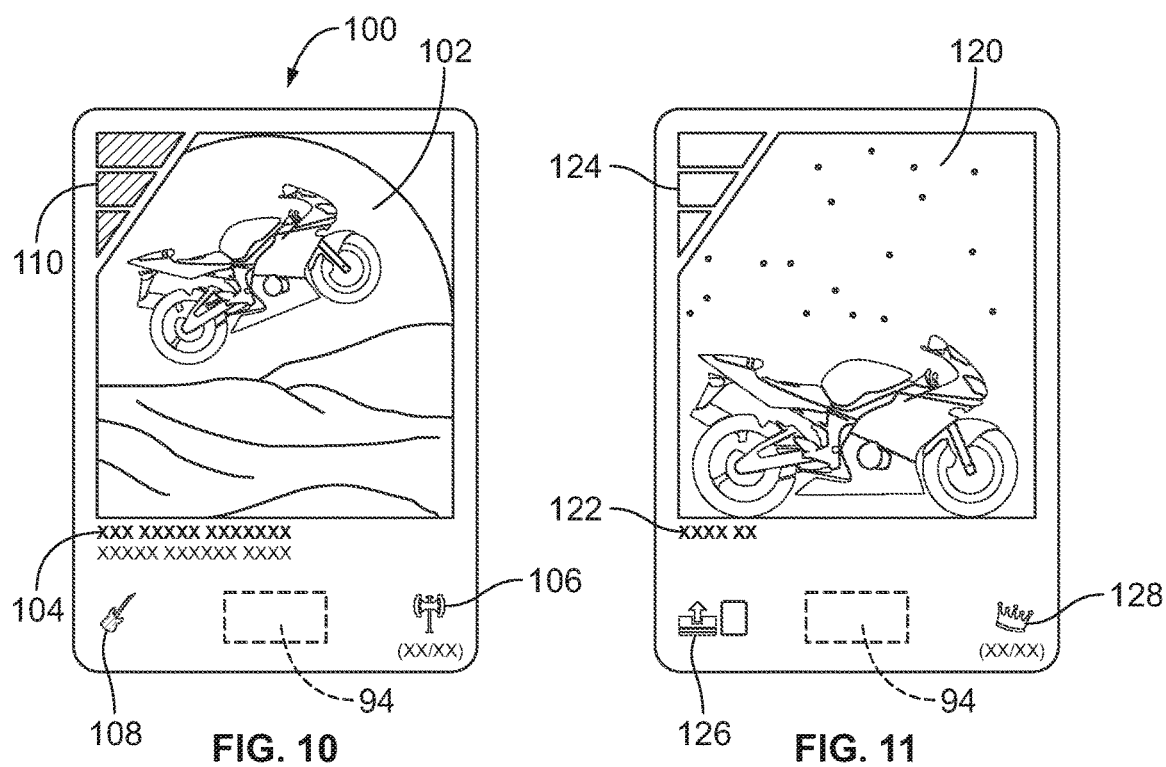
FIG. 10 is a plan view of a sample card.
Figure 11:
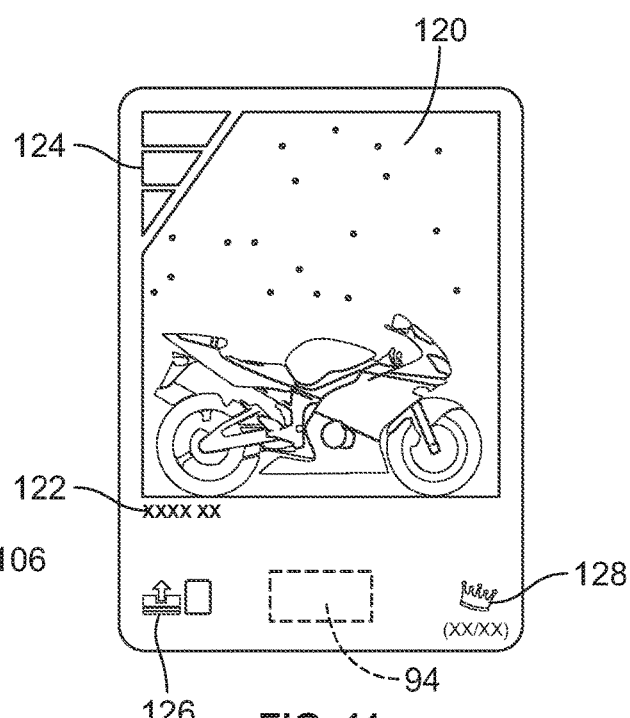
FIG. 11 is a plan view of another sample card.

Each of the multiplicity of cards includes an integrated circuit tag 94, FIGS. 10 and 11, between paper layers, each card having dimensions of approximately 2.5 inches by 3.5 inches. Printing may appear on both sides or if desired just one side. In the alternative, other material such as plastic layers may be used. The cards may be referred to as 'smart cards' and each includes the NFC/RFID tag. Each card may a thickness of about 350 microns (about 0.014 inches) and weighs about 300 grams per square meter. Each card has a value and the value determines whether one card 'beats' an opponent's card. Referring to FIG. 10, one type of card, referred to as a 'music card' 100 may have a graphic 102 with a name of the artist or song 104 immediately below the graphic. In the lower right corner an icon 106 may be placed indicating the deck from which the card comes. A symbol 108 in the lower left corner may indicate the musical instrument the card represents and plays, and a symbol 110 in the upper left corner indicates the levels of intensity of the card's sound. The card may also have a color tone to match one of the colors of the LED light illuminating the platform, with stacking features and colored light indicated selection or other indicia for user identification and selection. When played by stacking on the reading surface and pushing the actuator causes an equalizer to spin. Based on the level of the top card the equalizer clears the cards and they are placed on a discard pile. In a game called 'Clash' the equalizer may only instruct that the cards of an opponent are cleared.

In general terms, in one form of game play, cards are divided between player/opponents and a coin is flipped to determine which player goes first. Each player plays one or more cards per turn and when a card is played, the player receives a value or points. The value is added to that player's score. To end a turn the player depresses the actuator. If needed the light of the platform will light up to alert the player to depress the actuator. Play continues until a value or point threshold is reach by one of the players and that player is declared the winner.

In a game called 'Game Master' the App in the smart phone is like a casino dealer or the Dungeon Master of the game called Dungeon and Dragons and the players are requested to guess a mix of music being played. The music comes from a stack of cards loaded on the reading surface. During set-up, each player stacks his/her cards on the reading surface when given a green light. During reading the color will change to red. During multiple rounds of play, the players are told to perform certain actions by the app. For example, a player may be told to stack three orange cards on the reading surface. The platform may then light up in the color orange and blink three times to confirm that the player completed a proper action. The platform may also use the speaker to announce what it needs. A player may also give instructions to the platform (through the microphone) of actions to take, for example, remove a certain amount of cards from another player. To do this, the players need to stack their cards face down on the reading surface and the platform would announce that the other player must put a certain number of cards of a certain color on the reading surface. Play continues until one of the players has all of the cards.

In the Name that Mix (NTM) game mode the player explores Music Mixing by having the game mode that asks the users to guess the current mix of music being played. The music comes from the stack of cards which the player users can stack as a collection to load into the game before the game begins. The App will deconstruct all of the cards, taking each part of the song out, and the App will then create a random "mix" that has parts from all of the cards that were placed on the system at the start. Since the reader system 10 provides 20 Wild Cards, the App will be able to create over 40 MM different combinations of mixes for the users to guess. The App will play a random mix from the pieces of music from the cards placed on the single reading area at the system 10 surface region. Each player takes turns trying to guess the parts of the mix being playing. The game play proceeds as follows: If a player/team thinks they know a certain part, they will place the card on the system 10; Player/Team taps the appropriate actuator of the color they want to choose; Once it lands on a color they want, they will hit the actuator to lock it in; Player/Team gets points for correct answer; Goal: Player/Team with the most points at the end of X rounds, wins. Players will take turns using the cards to guess the parts of the current mix playing. To attempt a guess the player will place their card on the system and hit the actuator to illuminate the lane to the color of the piece of the song they think is being played.

In the Clash game or mode each player may start with a personal deck of 30 cards having six types of cards. Four basic card types, green bass, blue beat, red loop and yellow lead will each play a fixed audio sample when placed into a matching colored lane or slot on the platform. Multicolor wild cards may be placed into any lane or slot and play different audio samples as a function of where the card is placed. FX cards trigger special events. They may be played in different lanes based on their gameplay function. At the start of a game, the cards are shuffled and each player draws a hand of three to five cards depending on the number of players. The system randomly selects a player to go first. On each turn each player may perform two actions from among the following: play a basic or wild card into a matching lane or slot. If the lane is already occupied the player must play a card of equal or higher value. The light will indicate which player controls each lane. The player then plays an FX card and actuates the equalizer. The equalizer randomly cycles through the cards on the platform and if it lands on an opponent's card, all of the opponent's cards are cleared of power value. Within three seconds after playing the second card the player's turn is over and he/she draws two cards.

Scoring of the clash game is as follows: when a player plays a card on a lane one point is received. When an opponent's card is removed one point is received. After the first turn, should one of the four basic colors not be represented on the board, one point is earned for adding a card of the missing color. Should a player's cards occupy all five colored lanes during a turn one more point is received.

In a game named 'FX' the cards may have a graphic 120, FIG. 11, a card name 122, the card level 124 in the upper left hand corner, the card's ability 126 in the lower left corner and a deck icon 128. In a game called 'party,' each player begins with fifteen cards and draws three to five cards. The game lasts for five rounds and the app on the smart device will make requests of each player in each round. The requests comes from different information contained on the cards, such as color, value, instrument and music type. After each round the app will announce the number of cards to draw. The quicker a request is completed the more points are given. A bonus request is displayed after each round and more points are provided if the request is successfully completed. After five rounds the scores are added and the game is over.

The single physical reading surface has a major advantage over older apparatus in that it is compact and lightweight and is ideal for portability, allowing players to easily transport the system 10. The system is also simply constructed and yet is rugged and robust so as to produce a low cost structure. Because there is only one lane or zone in the system, there is no confusion on where to play a card. Simply stack cards on top of each other with each player's turn and everything plays accordingly. The system is about placing cards and interacting with lights and an actuator while the system provides feedback based on game play, only reading at the single reading area at the single surface region of a housing for collecting a plurality of the cards each placed serially with one another in a series forming a collection of two or more cards at the surface region of the housing.

Figure 12:
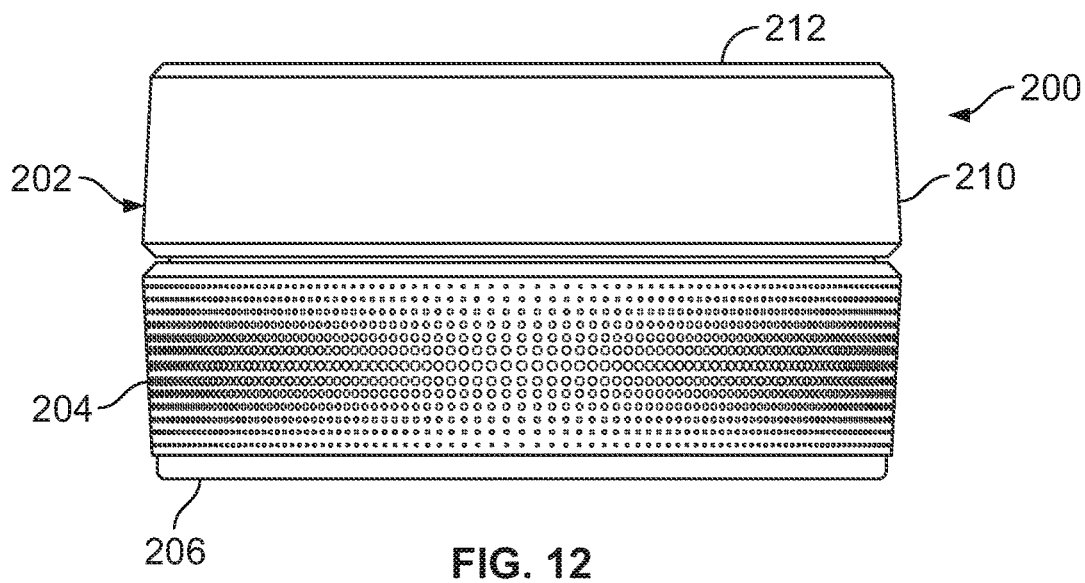
FIG. 12 is an isometric view of another preferred embodiment of the present invention in the form of a cylindrically shaped game system.
Figure 13:
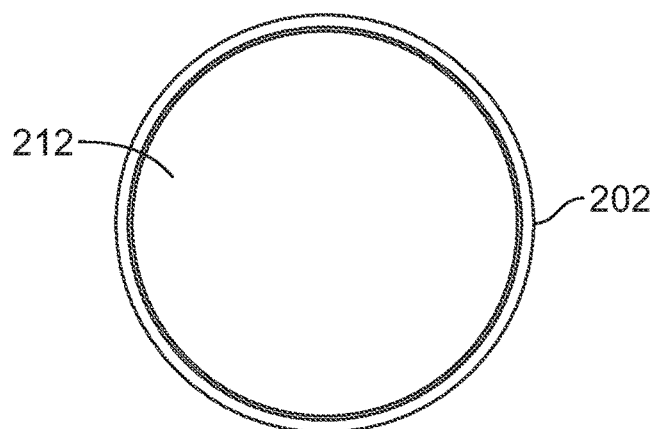
FIG. 13 is a top plan view of the game system shown in FIG. 12, illustrating a reading surface.
Figure 14:
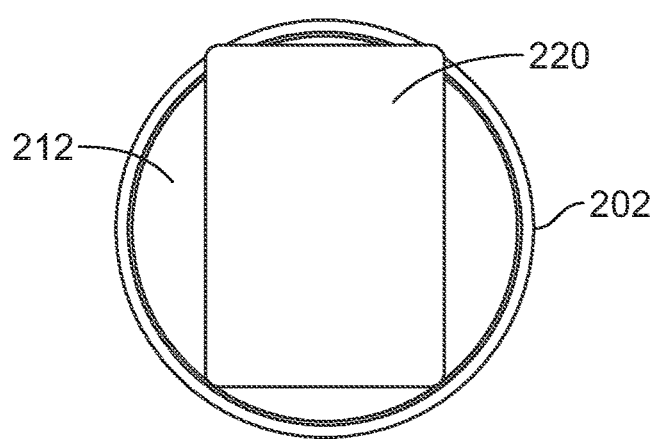
FIG. 14 is a top plan view of the game apparatus shown in FIG. 13, illustrating a playing card on the reading surface.

Another compact reading game system 200 is illustrated in FIG. 12, where the apparatus has a generally cylindrical platform 202. The platform is divided into several portions. A lower portion 204 of the housing includes an LED base 206 for providing feed back to the players and for storing the NFC tag reader, the antenna subsystem, the processor, the audio subsystem and other electronics for operation. Above the lower portion 204 is an actuator in the form of a selection dial 210 which a player twists to input data to the game system. It is noted that the twistable dial 210 is a substitute for the alternative actuators 60, 62, 64 and 70 shown in FIG. 2 or the actuator 66, FIG. 9. The selection dial 210 includes a top reading surface 212, FIGS. 12 and 13, for placement of one or more cards, such as the card 220.

Figure 15:
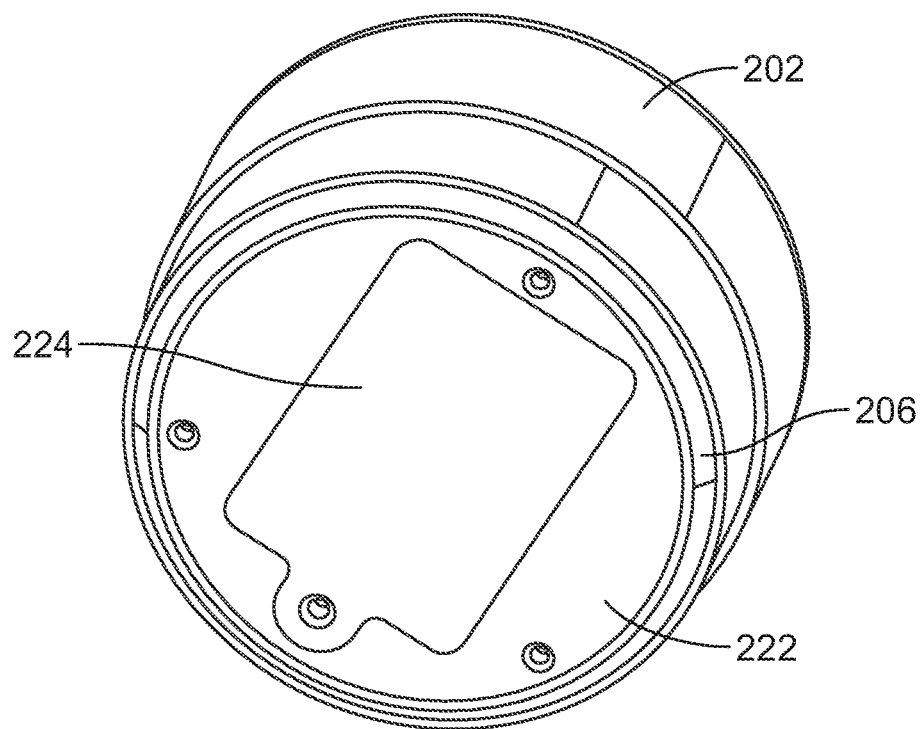
FIG. 15 is an upward looking isometric view of the bottom of the game apparatus shown in FIG. 12.
Figure 16:
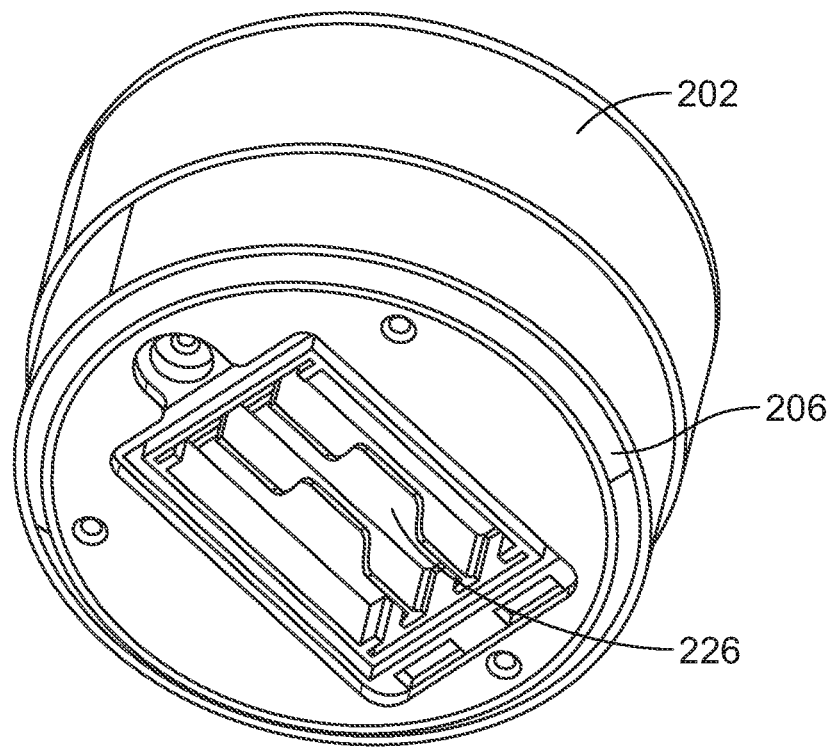
FIG. 16 is the same view of the game system as shown in FIG. 15, but with an open battery compartment.
Figure 17:
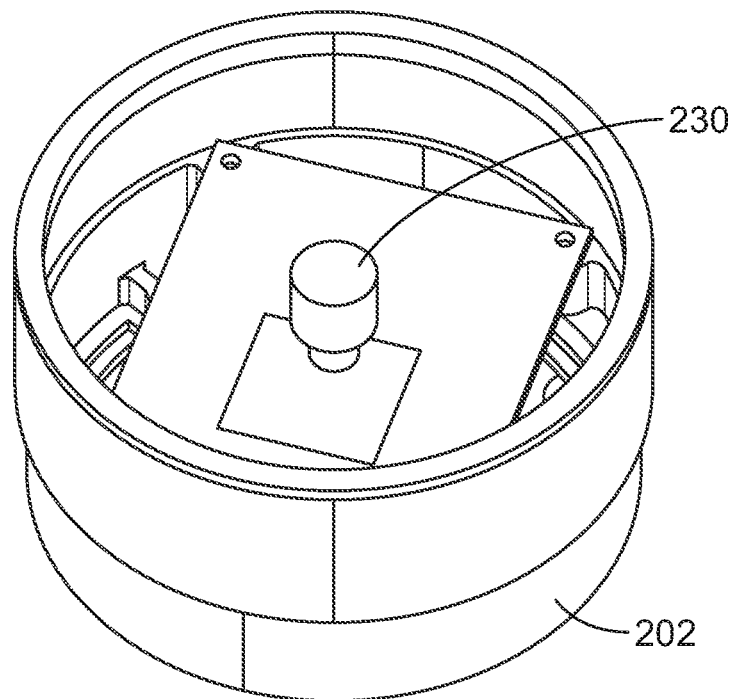
FIG. 17 is an isometric view of the game system shown in FIGS. 12-17, illustrating the reader.
Figure 18:
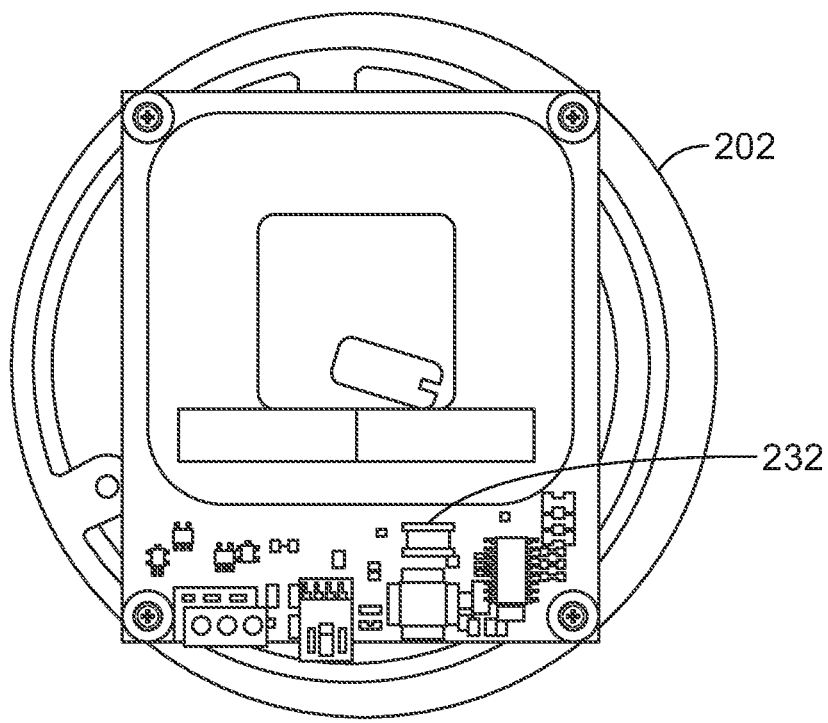
FIG. 18 is a bottom plan view of the game system shown in FIGS. 12-17, with the bottom removed to illustrate internal electronics.
Figure 19:
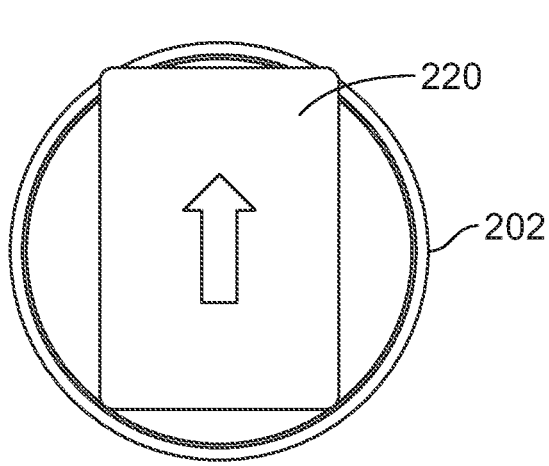
FIG. 19 is a top plan view of the game system identical to shown in FIGS. 12-19, illustrating the playing card in a first position on the reading surface.
Figure 20:
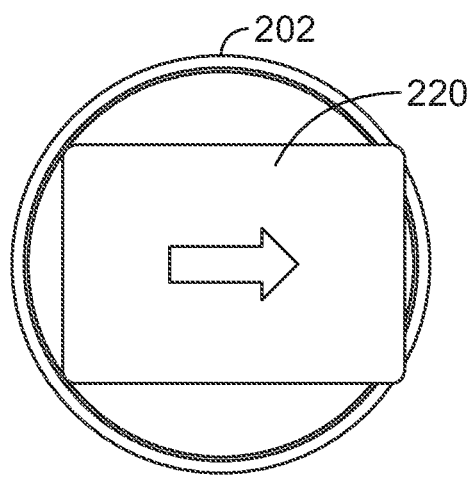
FIG. 20 is a top plan view of the game system identical to FIG. 19, but illustrating the playing card on the reading surface rotated 90°.
Figure 21:
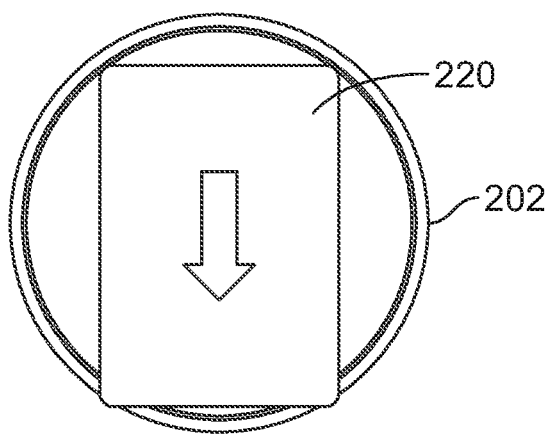
FIG. 21 is a top plan view of the game system identical to FIG. 19, but illustrating the playing card on the reading surface rotated 180°.
Figure 22:
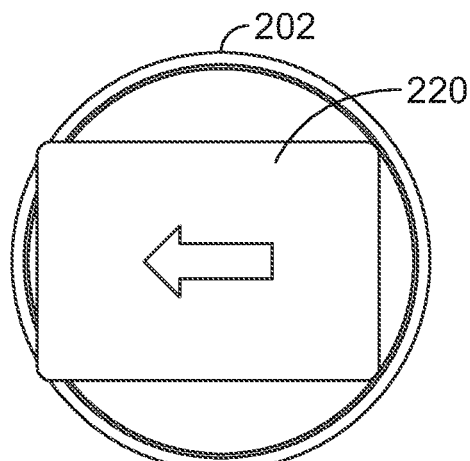
FIG. 22 is a top plan view of the game system identical to FIG. 19, but illustrating the playing card on the reading surface rotated 270°.

Referring to FIGS. 15 and 16, the bottom surface 222 is illustrated showing a battery cover 224 and a battery compartment 226. Referring to FIGS. 17 and 18, the reader 230 and electronics 232 are shown. In FIGS. 19-22, rotation of the dial 210 and of the card 220 is shown in rotational positions of 0°, 90°, 180°, and 270°.

The game systems disclosed in detail above have great play value, are fun to use and easy to operate, and yet the game systems are each compact, structurally robust, and they may be produced at reasonable cost.

From the foregoing, it can be seen that there has been provided features for an improved game system. While particular embodiments and variations of the present invention have been shown and described in great detail, it will be obvious to those skilled in the art that changes and modifications may be made without departing from the invention in its broader aspects. Therefore, the aim is to cover all such changes and modifications as fall within the true spirit and scope of the invention. The matters set forth in the foregoing description and accompanying drawings are offered by way of illustrations only and not as limitations. The actual scope of the invention is to be defined by the subsequent claims as mandated by the United States Code, Title 35, Section 112, when viewed in their proper perspective based on the prior art.

What is claimed is:

1. A playing card reader game system for reading a plurality of type information identifiers, the system comprising:
    a multiplicity of integrated circuit tags, each tag including type information identifiers;
    a multiplicity of playing cards, each card including at least one tag for transmitting one or more of the type information identifiers associated with the tag of each card;
    a first housing comprising only a single reading area at a surface region of the housing for collecting a plurality of the cards each placed serially with one another in a series forming a collection of two or more cards at the surface region of the housing;
    an antenna subsystem in the housing with an antenna signal range to receive the type information identifiers associated with the collection of cards at the surface region;
    a tag reader for reading the type information identifiers received with the antenna subsystem from each card of the collection of cards at the surface region;
    a light source for simultaneously illuminating one or more of a multiplicity of illuminating colors in relation to the surface region of the housing;
    an actuator for changing one or more of the illuminating colors, the actuator further selecting the type information identifiers associated with the cards at the surface region to be received with the antenna subsystem;
    an information processor; and
    an audio subsystem in communication with the information processor at the first housing for issuing announcement sounds and music composition sounds responsive to the tag reader, light source and actuator.

2. The system recited in claim 1, further comprising a second housing for covering the surface region of the first housing for collecting a plurality of the cards.

3. The system recited in claim 2, wherein the second housing comprises containing structure for the multiplicity of playing cards for storing while not in use.

4. The system recited in claim 2, further comprising a second housing for mounting a smart device when said second housing is removed from covering the surface region of the first housing, the smart device being in communication with the information processor, the tag reader for identifying the type information identifiers received for use by the smart device with said second housing mounting the smart device therein.

5. The system recited in claim 1, further comprising a smart device controlling the light source for simultaneously illuminating one or more of a multiplicity of illuminating colors with reference to the type information identifiers associated with the cards at the surface region to be received.

6. The system recited in claim 5, wherein the cards further comprise external visual indicia thereon corresponding with one or more of the multiplicity of illuminating colors and with reference to the type information identifiers associated with the cards at the surface region to be received.

7. The system recited in claim 5, said first housing comprising a circular platform housing defining an outer diameter about the single reading area, and wherein the actuator comprises a rotating actuator which changes the one or more of the illuminating colors for selecting the external visual indicia associated with the cards which may be played at the surface region of the first housing by the player.

8. The system recited in claim 5, wherein the smart device controls the audio subsystem for issuing the announcement and music composition sounds responsive to the tag reader, light source and actuator.

9. The system recited in claim 1, wherein each playing card comprises a playing card surface area, and the first housing comprises a first housing surface area less than five times (5×) the playing card surface area.

10. The system recited in claim 1, wherein each playing card comprises a playing card surface area, and the single reading area comprises a surface region surface area less than two times (2×) the playing card surface area.

11. A playing card reader game system for reading a plurality of type information identifiers, the system comprising:
    a multiplicity of playing cards, each playing card comprising a single playing card surface area, and including at least one integrated circuit tag, each tag including type information identifiers for transmitting one or more of the type information identifiers associated with the tag of each card;
    a first housing comprising a single reading area at a surface region of the housing for collecting a plurality of the cards each placed serially with one another in a series forming a collection of two or more cards at the surface region of the housing, the first housing comprising a first housing surface area and the single reading area comprising a surface region surface area, the first housing surface area and the surface region surface area respectively being less than five times (5×) and two times (2×) the playing card surface area;
    an antenna subsystem in the housing with an antenna signal range to receive the type information identifiers associated with the collection of cards only at the surface region;
    a light source for simultaneously illuminating one or more of a multiplicity of illuminating colors in relation to the surface region of the housing, wherein the light source simultaneously illuminates one or more of a multiplicity of illuminating colors with reference to the type information identifiers associated with the cards at the surface region to be received;
    an actuator at the first housing for changing one or more of the illuminating colors, the actuator further selecting the type information identifiers associated with the cards at the surface region to be received with the antenna subsystem; and a single tag reader for reading the type information identifiers received with the antenna subsystem from each card of the collection of cards at the surface region, the system only including the single tag reader for reading the type information identifiers.

12. The system recited in claim 11, further comprising a second housing for covering the surface region of the first housing for collecting a plurality of the cards.

13. The system recited in claim 12, wherein the second housing comprises containing structure for the multiplicity of playing cards for storing while not in use.

14. The system recited in claim 11, further comprising a second housing for mounting a smart device, the smart device being in communication with the information processor, the tag reader for identifying the type information identifiers received for use by the smart device.

15. The system recited in claim 11, further comprising
an information processor; and
an audio subsystem in communication with the information processor at the first housing for issuing announcement sounds and music composition sounds responsive to the tag reader, light source and actuator.

16. The system recited in claim 15, wherein the cards further comprise external visual indicia thereon corresponding with one or more of the multiplicity of illuminating colors and with reference to the type information identifiers associated with the cards at the surface region to be received, wherein the actuator changes the one or more of the illuminating colors for selecting the external visual indicia associated with the cards which may be played at the surface region of the first housing by the player.

17. The system recited in claim 15, wherein the audio subsystem issues the announcement and music composition sounds responsive to the tag reader, light source and actuator.

18. A playing card reader game method for reading a plurality of type information identifiers, the method comprising the steps of:
providing a multiplicity of integrated circuit tags, each tag including type information identifiers, and respectively a multiplicity of playing cards, each card including at least one tag for transmitting one or more of the type information identifiers associated with the tag of each card;
reading at a single reading area only at a single surface region of a housing for collecting a plurality of the cards each placed serially with one another in a series forming a collection of two or more cards at the surface region of the housing;
locating an antenna subsystem in the housing with an antenna signal range to receive the type information identifiers associated with the collection of cards at the surface region, with only a single tag reader for reading the type information identifiers received with the antenna subsystem from each card of the collection of cards at the single surface region;
illuminating a light source with one or more of a multiplicity of colors in relation to the surface region of the housing;
changing one or more of the illuminating colors with an actuator selecting the type information identifiers associated with the cards at the surface region to be received with the antenna subsystem; and
providing an audio subsystem for issuing announcement sounds and music composition sounds responsive to the tag reader, light source and actuator.

19. The method recited in claim 18, further providing a smart device for controlling the light source for simultaneously illuminating one or more of a multiplicity of illuminating colors with reference to the type information identifiers associated with the cards at the surface region to be received corresponding with external visual indicia on the cards with one or more of the multiplicity of illuminating colors and with reference to the type information identifiers associated with the cards played at the surface region of the first housing by the player.

20. The method recited in claim 18, wherein the audio subsystem for issuing the announcement and music composition sounds responsive includes and output speaker for making audible sounds, and a microphone feature for receiving audible information from a game player user.

* * * * *